United States Patent
King et al.

(10) Patent No.: US 11,106,548 B2
(45) Date of Patent: Aug. 31, 2021

(54) DYNAMIC APPLICATION CONSISTENT DATA RESTORATION

(71) Applicant: EMC IP Holding Company LLC, Hopkinton, MA (US)

(72) Inventors: James R. King, Norwood, MA (US); Ethan A. Kaley, Plainville, MA (US); Joseph J. Gorse, III, Tewksbury, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 178 days.

(21) Appl. No.: 16/653,560

(22) Filed: Oct. 15, 2019

(65) Prior Publication Data
US 2021/0109823 A1    Apr. 15, 2021

(51) Int. Cl.
*G06F 11/14*    (2006.01)

(52) U.S. Cl.
CPC ...... *G06F 11/1469* (2013.01); *G06F 11/1451* (2013.01); *G06F 11/1466* (2013.01); *G06F 11/1471* (2013.01)

(58) Field of Classification Search
CPC ............ G06F 11/1469; G06F 11/1471; G06F 11/1466; G06F 11/1451
See application file for complete search history.

(56) References Cited

U.S. PATENT DOCUMENTS

| | | | | |
|---|---|---|---|---|
| 7,689,859 | B2* | 3/2010 | Westenberg | G06F 11/1466 714/6.11 |
| 8,850,514 | B2* | 9/2014 | McGrath | G06F 9/455 726/1 |
| 10,459,823 | B1* | 10/2019 | Lieberman | G06F 11/362 |
| 10,613,885 | B2* | 4/2020 | Aronovich | G06F 9/45545 |
| 10,705,880 | B2* | 7/2020 | Curtis | H04L 41/082 |
| 2010/0005258 | A1* | 1/2010 | Westenberg | G06F 11/1466 711/162 |
| 2013/0298183 | A1* | 11/2013 | McGrath | G06F 21/53 726/1 |
| 2017/0185488 | A1* | 6/2017 | Kumarasamy | G06F 11/1482 |
| 2018/0285199 | A1* | 10/2018 | Mitkar | G06F 11/1451 |
| 2018/0285210 | A1* | 10/2018 | Mitkar | G06F 11/3006 |
| 2019/0278928 | A1* | 9/2019 | Rungta | G06F 9/44505 |
| 2019/0332366 | A1* | 10/2019 | Natanzon | G06F 8/60 |
| 2019/0332483 | A1* | 10/2019 | Natanzon | G06F 11/1464 |

OTHER PUBLICATIONS

Anonymous, "What is a Container: A standardized unit of software", Aug. 8, 2018, pp. 1-5, http://web.archive.org/web/20180808094239/https://www.docker.com/resources/what-container (Year: 2018).*

* cited by examiner

*Primary Examiner* — Christopher D Birkhimer
(74) *Attorney, Agent, or Firm* — Workman Nydegger

(57) ABSTRACT

Restore operations in containerized environments are disclosed. An ephemeral instance of an application is created and a datastore is mounted to the ephemeral instance. The ephemeral instance is not accessible to users or application. The backup data is restored to the datastore. Once restored, the datastore is then mounted to a production instance and production resumes.

18 Claims, 3 Drawing Sheets

DYNAMIC APPLICATION CONSISTENT DATA RESTORATION

FIELD OF THE INVENTION

Embodiments of the present invention generally relate to data protection operations. More particularly, at least some embodiments of the invention relate to systems, hardware, software, computer-readable media, and methods for performing data protection operations including restore operations in container orchestration systems.

BACKGROUND

Traditionally, software development focused on developing code for a certain computing environment. Attempts to run the same software in a different environment was not very successful. Virtual machines solved this problem, at least in part, by allowing the underlying hardware to be abstracted. Containerization takes this a step further and abstracts at the operating system level.

A containerized application can run in many different environments. Generally, a container includes the application, dependencies, libraries, and the like that allow the container to be portable. In effect, the application is self-contained because everything needed to run the application is included in the container. This allows a container to run efficiently in different environments. Popular containerization systems include Docker and Kubernetes.

Often, containers are stateless in nature. Containerized applications receive data from one source, perform processing, and deliver the processed data to a target. There is no need to keep any type of persistent storage or state. This allows containers to be deployed quickly at least because containers are not concerned about how or where the data is stored.

However, stateful containers are becoming more common. In fact, the release of the container storage interface (CSI) marks full support for persistent datasets within a container orchestration system. Because of the support for persistent datasets, many organizations may begin migrating stateful applications to containerized environments. As a result, this introduces a need to backup the persistent data and provide the ability to restore the persistent data in an application consistent manner.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
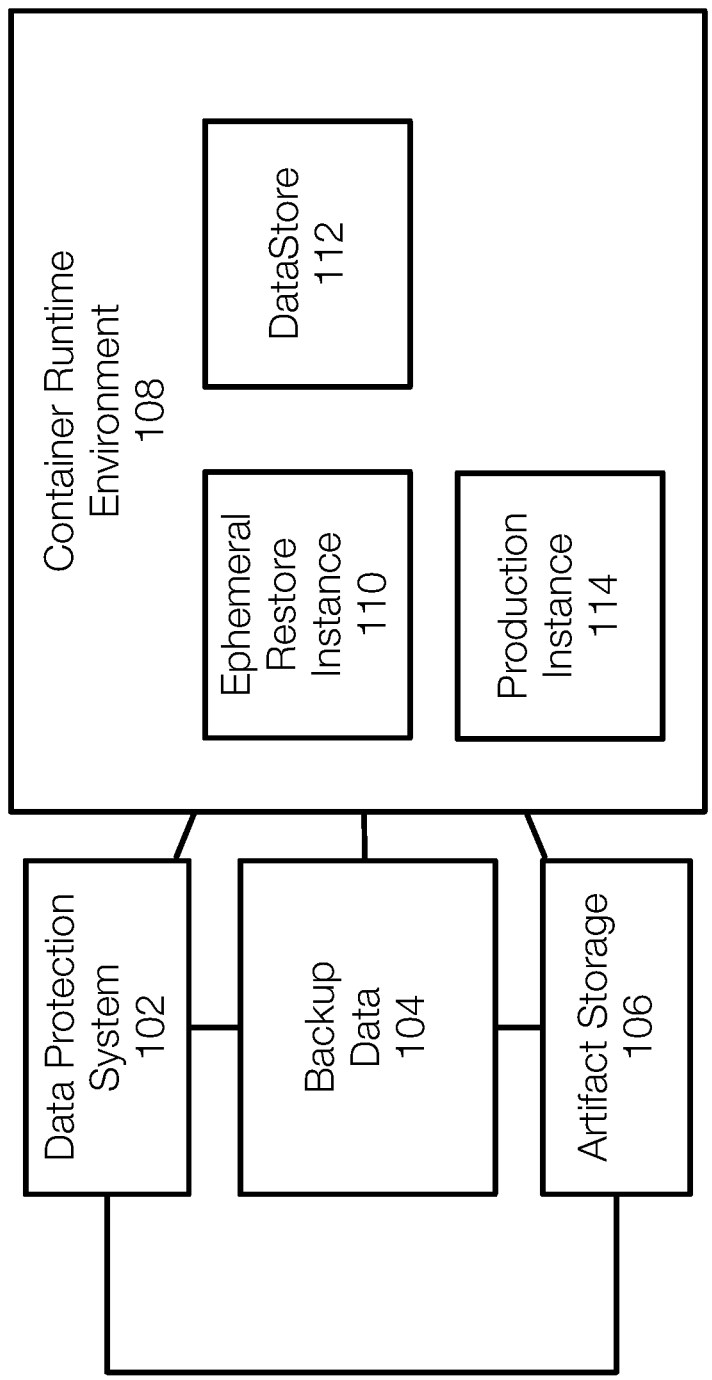
FIG. 1 illustrates an example of an environment for dynamic application consistent data restoration.

Embodiments of the present invention generally relate to data protection operations. More particularly, at least some embodiments of the invention relate to systems, hardware, software, computer-readable media, and methods for data protection operations including restore operations, backup operations, deduplication operations, replication operations, failover operations, or the like or combination thereof.

In general, example embodiments of the invention relate to restoring persistent application data within the paradigm of container orchestration systems or with respect to containerized applications. Embodiments of the invention further relate to performing seamless restore operations of persistent data in an application consistent way without requiring end users to specifically describe all attributes of the application.

Embodiments of the invention further relate to restoring containerized applications that include or that are associated with persistent data. The need for persistent data occurs for various reasons. For example, it may be more complicated to program a stateless containerized application. Alternatively, some containers may need to share information or data with other containers. In addition, the likelihood of persistent data requirements increases when a containerized application is active for a longer period of time. The containerized applications can be of any type. The following discussion may reference database type containerized applications, but embodiments of the invention are not so limited.

During a conventional database consistent restore operation, manual steps must be taken to ensure consumers cannot access the data mid-restore. Failure to take these steps can lead to consumer application failures, lost database transactions or invalid data states.

In addition, end-users must describe all aspects of the application for restoration to ensure the correct tools and procedures are utilized. This is typically a manual and error prone process that includes human action and conceptual knowledge of the database/application deployment.

While conventional restore processes relied on an imperative type model, embodiments of the invention allow for data protection operations that may use declarative models. A declarative model, by way of example, does not specify explicit steps like an imperative model. Rather, a declarative model may specify what the desired result is rather than specify the specific steps to achieve the desired result. A declarative model for a database application may specify, for example, a desired state without specifying how to achieve that state.

During a backup operation, a backup is generated. The backup may be associated with various artifacts. Artifacts may include declarative models of the application state in a container orchestration system, application manifests, storage requirements, or the like or combination thereof. In one example, a manifest is exported as part of the backup process. The exported manifest may include a container name and type and may include a version that can be used during a restore operation. The manifest may include or identify the volumes and their respective mappings, which can be used to create mountpoints and determine whether intermediate datastores are created. The manifest may include settings such as environment variables, port mappings, registry values.

By dynamically inspecting the backup artifacts in the context of a container runtime environment, the application related to the backup data can be inferred during a restore operation. For example, the exported manifest can be inspected to dynamically generate the application manifest definition for the restore operation, which may include generating a temporary or ephemeral restore instance or container to restore the data. In some applications, the application type and other application metadata may be specified in the backup. By way of example and not limitation, an artifact can be the backup data, manifest information describing the deployment and relationship of that data to an application specific configuration and setup and/or other application metadata. In one example, the manifest may identify an application type, an application version, a schema, IOPs, bandwidth requirements, memory requirements, and the like. The artifacts allow a restore operation in a containerized environment that does not violate atomicity during the restore operation. By ensuring atomicity, the data is not accessible mid-restore.

The artifacts allows the data protection system to create an instance of the application that is specific to the restore operation and that is not accessible to users or other applications. This allows an instance of that application, an ephemeral instance, to be created without exposing the real version. More specifically, the ephemeral instance and/or the data is not exposed to users or other applications during the restore operation.

Consequently, by inspecting the backup artifacts, the information required to initialize an ephemeral application instance can be inferred or determined. This circumvents the need for human interaction and knowledge of the application. For example, an inspection of the backup data or of the artifacts can allow the data protection system to infer the database type, storage volumes, data size and needed storage size, application type, mappings, or the like. Inspecting the backup, for example, may allow the data protection system to determine how much storage is needed to restore the data and to restore for a specific application.

An ephemeral restore instance can be used to restore the data from the backup. During the restore operation, using an ephemeral restore instance prevents invalid data states and undesired application interactions. In other words, the restore operation can proceed without user interference and without allowing the data being restored to be available to a production application.

In one example, the data being restored using the ephemeral restore instance is the same data that will be used by the production instance, which production instance will be deployed after the data is restored. Embodiments of the invention effectively isolate the entry point to the storage volume used for the restored data from user access. As a result, no user interaction is possible during while the application is in a transient state. Only after the data is fully restored and in a consistent state is the production application instantiated such that production may resume using the restored data. This allows the restore of persistent data in containerized applications.

FIG. 1 illustrates an example of a containerized environment in which persistent data is restored. FIG. 1 illustrates a data protection system 102. The data protection system 102 may be associated with a server, agents that may be installed on host nodes, or the like. Further, the data protection system 102 may itself be containerized.

FIG. 1 also illustrates a container runtime environment 108. The container runtime environment 108, by way of example, is software that is configured to execute containers and to manage containers that are instantiated on a node. The container runtime environment 108 may include a container runtime interface, which allows access to different runtime environments and which may allow the use of different runtimes without recompiling requirements. The data protection system 102 is configured to backup and/or restore containerized applications including their persistent data. In one embodiment, the data protection system 102 may protect the persistent data and/or the containerized application and allow for the persistent data to be restored to an instance of the containerized application.

The data protection system 102 has generated backup data 104. The backup data 104 may be discrete or continuous in nature and may allow a containerized application to be restored to various points in time. FIG. 1 also illustrates an artifact storage 106. The artifact storage 106 may also include the backups. In other words, the artifact storage 106 and the backup data may be part of the same save set or storage. In one example, the artifact storage 106 or artifacts include the backup data 104.

During a restore operation, the data protection system 102 may evaluate the backup data or artifacts to identify or to infer the application to which the data is related. The artifact storage 106 may include a declarative model of the application state, a manifest, storage requirements, and other container metadata. The declarative model may identify the state to which the application should be restored. The artifacts may include manifest information describing the deployment and relationship of the backup data to an application specific configuration and set up.

Once the artifacts have been identified and the application information or type is inferred or determined, the data protection system 102 may create a datastore 112 and instantiate an ephemeral restore instance 110 in the container runtime environment 108. The datastore 112 may be inside the container runtime environment 108 or accessible to the container runtime environment. The ephemeral restore instance 110 is not exposed to end users and is isolated from user or other application access. The datastore 112 is mounted to the ephemeral restore instance 110.

The data from the backup data 104 is then restored to the datastore 112. This may be achieved by an application process of the data protection system and/or by the ephemeral restore instance 110. Once the datastore 112 reaches an application consistent state or application consistent data, the datastore 112 may be demounted from the ephemeral restore instance 110.

Next, the production instance 114 of the application is started and the datastore 112 is mounted to the production instance 114. The production instance 114 is available for normal production use. This typically completes the restore operation.

Figure 2:
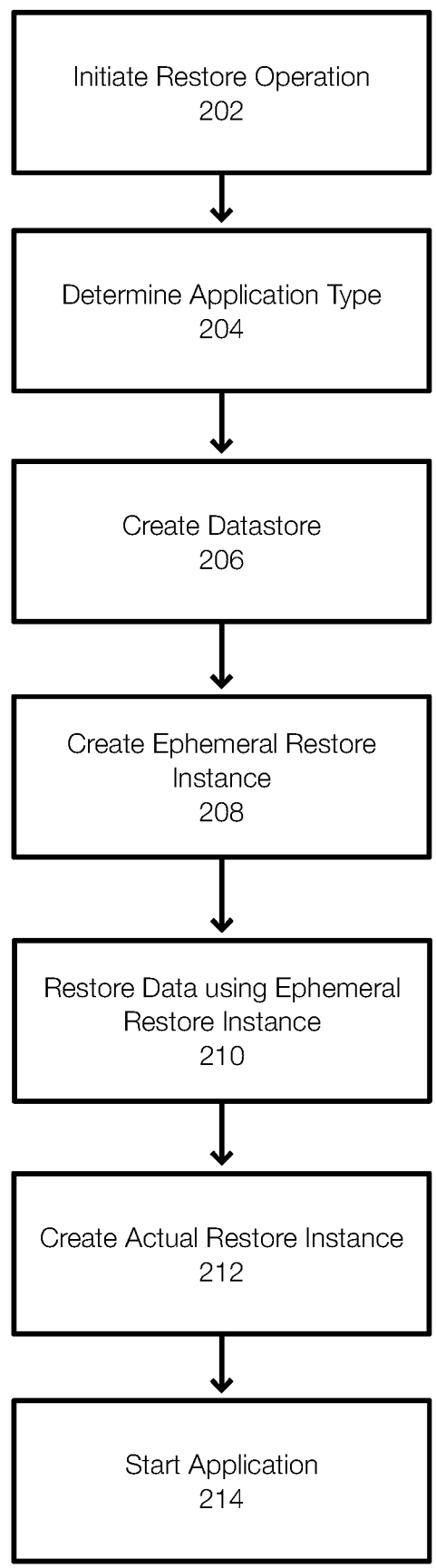
FIG. 2 illustrates an example of a method for dynamic application consistent data restoration.

FIG. 2 illustrates an example of a method for restoring data in a containerized environment. The method shown in FIG. 2 can circumvent human interaction when restoring a containerized application (and thus reduce manual errors) and simplify the restore process. Further, the application is restored in a manner that ensures the restored data is consistent. Access to the data is prevented until the restore operation is completed.

In FIG. 2, the restore operation is initiated 202. The application type (and/or other application information such as version, name or the like) is then determined 204. The application type may be determined by analyzing artifacts, which may include the backup data, declarative models, manifests, and other application metadata. Next, a datastore is allocated or created 206 in the container runtime environment and an ephemeral restore instance 208 is also instantiated.

The data is restored to the datastore using the ephemeral restore instance. At this stage, users of the application and/or other applications cannot access the datastore. This prevents application failures, lost database transactions, and/or invalid data states. In fact, the original service or application that is addressed via DNS/IP is not available to consumers during the restore operation. The ephemeral restore instance may have a different DNS/IP that is not known to users or applications and is not available. As a result, consumers or users can fail safe due to the connection loss.

Once the datastore and the ephemeral restore instance are created and the datastore is mounted to the ephemeral restore instance, the data is restored 210 by the ephemeral restore instance using the backup. When the restore is completed, an actual or production instance is created 212 and the application is started 214. The data in the datastore is mounted to the production instance. Consumers or other users and/or applications have access to the production instance. The production instance, however, is not made available until the data is in a consistent state and is fully restored.

Figure 3:
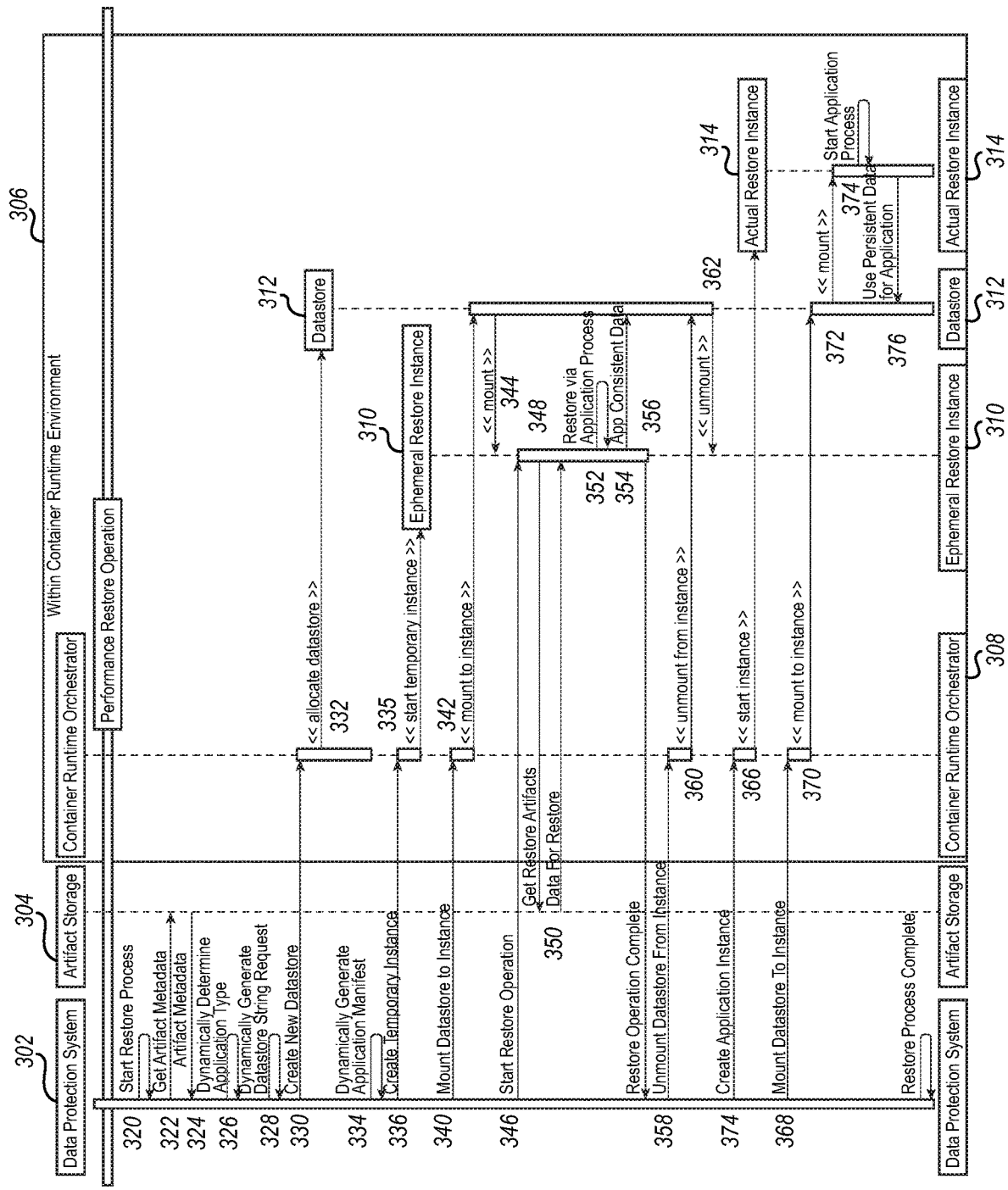
FIG. 3 illustrates another example of a method for dynamic application consistent data restoration.

FIG. 3 illustrates a more detailed example of a restore operation in a containerized environment where persistent data is restored in a consistent state. In this example, the data protection system 302 may initiate 320 a restore process. The data protection system 302 may obtain artifacts from the artifact storage 304. In this example, the data protection system requests 322 the artifacts from the artifact storage 304 and the artifact storage returns 324 the artifacts to the data protection system. As previously stated, the artifacts may include a declarative model, storage size, application type, database type, storage volumes, and the like or combination thereof.

The artifacts allows the data protection system 302 to dynamically determine 326 the application type, required storage, and other characteristics or attributes of the application. The data protection system may also evaluate the backup data to determine these characteristics of the application.

A datastore request is then generated 328 and the datastore is created 330. In one example, the request is sent to the container runtime orchestrator 308 and the container runtime orchestrator may allocate 332 the datastore 312 within the container runtime environment 306 or provide access to a datastore.

Next, the data protection system 302 may generate 334 an application manifest, which describes the application or is used to start the ephemeral instance. A temporary application instance is created or instructed 336 using the manifest and results in starting 338 ephemeral restore instance 310 within the container runtime environment 306.

Next, the data protection system 302 sends a command to mount 340 the datastore to the ephemeral restore instance 310 to the datastore 312. Thus, the datastore 312 is mounted, by the container runtime orchestrator 308, to the ephemeral restore instance 312 at steps 342 and 344. These steps 324 and 344, as well as other aspects of FIG. 3, may represent commands or requests that are performed within the environment.

The data protection operation then starts 346 the restore operation by sending an instruction to the ephemeral restore instance 310. The ephemeral restore instance 310 obtains the restore artifacts 348 including the backup data for restore 350 and restores 352 via an application process. The restore process continues until an application consistent data state 354 is achieved. The ephemeral restore instance then indicates 356 that the restore operation is complete. The ephemeral restore instance, for example, may report to the data protection system that the data has been restored and is completed.

The data protection system 302 sends a command to unmount 358 the datastore from the ephemeral restore instance 310. The container runtime orchestrator 308 unmounts the datastore from the ephemeral restore instance at 360 and 362.

Next, the data protection system 302 may start 364 a production instance. The container runtime orchestrator 308, in response to this request at 364, starts 366 the production instance or the actual restore instance 314 in the container runtime environment 306.

The data protection system 302 sends 368 a request to mount the datastore 312, which is in a consistent state and has been fully recovered by the restore operation, to the production instance 314. The container runtime orchestrator causes the datastore to be mounted at 370 and 372. The production application starts 374 and uses 376 the recovered persistent data for the production instance.

Advantageously, backup artifacts are inspected to infer or determine the application metadata required to initialize the ephemeral application instance. This allows the data, including persistent data, to be restored without the need for human interaction and knowledge of the application and without allowing access to the restored data until the data is fully prepared and in a consistent state. Information about the application is inferred from data within the backup (database type, storage volumes, etc.) This data can subsequently be leveraged as described herein.

Using an ephemeral restore instance, which is not accessible via DNS or IP to other users or applications advantageously prevents invalid data states and undesired application interactions. The ephemeral resort instance is, in one embodiment, a temporary instance of the production application. The storage for this temporary instance is the same storage volume as the one that will be used by the production instance, to be deployed later. As previously stated, the entry point to this storage volume is isolated from user access by embodiments of the invention and there is no possibility of user interaction during this transient application state.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations in containerized environments. Such operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

The physical computing devices includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

Following are some further example embodiments of the invention. These are presented only by way of example and are not intended to limit the scope of the invention in any way.

Embodiment 1. A method for restoring backup data in a container runtime environment, the method includes one or more of initiating a restore operation to restore a containerized application associated with the backup data, obtaining artifacts from an artifact storage to determine an application type associated with the backup data, creating a datastore in a container runtime environment based on the artifacts and the application type, mounting the datastore to an ephemeral restore instance, restoring the backup data to the datastore by the ephemeral restore instance, creating a production instance of the application in the container runtime environment, and mounting the datastore to the production instance for operation.

Embodiment 2. The method of embodiment 1, further including sending a request to an artifact storage to obtain the artifacts, wherein the artifacts include at least one of the backup data, a declarative model, and an application manifest.

Embodiment 3. The method of embodiments 1 and/or 2, wherein the datastore, when mounted to the ephemeral restore instance, is not accessible to end-users or other applications.

Embodiment 4. The method of embodiments 1, 2, and/or 3, further comprising dynamically generating a manifest based on the artifacts, which may include an exported manifest exported during a backup operation.

Embodiment 5. The method of embodiments 1, 2, 3, and/or 4, further comprising unmounting the datastore from the ephemeral restore instance after the backup data is restored to the datastore.

Embodiment 6. The method of embodiments 1, 2, 3, 4, and/or 5, wherein the datastore is isolated from user access during the restore operation.

Embodiment 7. The method of embodiments 1, 2, 3, 4, 5, and/or 6, wherein the ephemeral restore instance is a temporary instance of the production instance.

Embodiment 8. A non-transitory storage medium having stored therein instructions that are executable by one or more hardware processors to perform the embodiments of 1, 2, 3, 4, 5, 6, 7, and/or 8.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for restoring backup data in a container runtime environment, the method comprising:
   initiating a restore operation to restore a containerized application associated with the backup data;
   obtaining artifacts from an artifact storage to determine an application type associated with the backup data;
   creating a datastore in a container runtime environment based on the artifacts and the application type
   mounting the datastore to an ephemeral restore instance;
   restoring the backup data to the datastore by the ephemeral restore instance;
   creating a production instance of the application in the container runtime environment; and
   mounting the datastore to the production instance for operation.

2. The method of claim 1, further comprising sending a request to an artifact storage to obtain the artifacts, wherein the artifacts include at least one of the backup data, a declarative model, and an application manifest.

3. The method of claim 1, wherein the datastore, when mounted to the ephemeral restore instance, is not accessible to end-users or other applications.

4. The method of claim 1, further comprising dynamically generating a manifest based on the artifacts.

5. The method of claim 1, further comprising unmounting the datastore from the ephemeral restore instance after the backup data is restored to the datastore.

6. The method of claim 1, wherein the datastore is isolated from user access during the restore operation.

7. The method of claim 1, wherein the ephemeral restore instance is a temporary instance of the production instance.

8. The method of claim 1, further comprising backing up the containerized application including persistent data in the backup data.

9. The method of claim 8, further comprising exporting a manifest that is included with the backup data.

10. A non-transitory storage medium having stored therein instructions that are executable by one or more hardware processors to perform operations comprising:
   initiating a restore operation to restore a containerized application associated with the backup data;
   obtaining artifacts from an artifact storage to determine an application type associated with the backup data;
   creating a datastore in a container runtime environment based on the artifacts and the application type
   mounting the datastore to an ephemeral restore instance;
   restoring the backup data to the datastore by the ephemeral restore instance;
   creating a production instance of the application in the container runtime environment; and
   mounting the datastore to the production instance for operation.

11. The non-transitory computer readable medium of claim 10, the operations further comprising sending a request to an artifact storage to obtain the artifacts, wherein the artifacts include at least one of the backup data, a declarative model, and an application manifest.

12. The non-transitory computer readable medium of claim 10, wherein the datastore, when mounted to the ephemeral restore instance, is not accessible to end-users or other applications.

13. The non-transitory computer readable medium of claim 10, the operations further comprising dynamically generating a manifest based on the artifacts.

14. The non-transitory computer readable medium of claim 10, the operations further comprising unmounting the datastore from the ephemeral restore instance after the backup data is restored to the datastore.

15. The non-transitory computer readable medium of claim 10, wherein the datastore is isolated from user access during the restore operation.

16. The non-transitory computer readable medium of claim 10, wherein the ephemeral restore instance is a temporary instance of the production instance.

17. The non-transitory computer readable medium of claim 10, the operations further comprising backing up the containerized application including persistent data in the backup data.

18. The method of claim 8, the operations further comprising exporting a manifest that is included with the backup data.

* * * * *